United States Patent
Cheng et al.

(10) Patent No.: US 9,825,874 B2
(45) Date of Patent: Nov. 21, 2017

(54) DYNAMICALLY OPTIMIZED QUEUE IN DATA ROUTING

(71) Applicant: T-Mobile, USA, Inc., Bellevue, WA (US)

(72) Inventors: Hailei Cheng, Bellevue, WA (US); Damon Cagle, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 146 days.

(21) Appl. No.: 15/073,487

(22) Filed: Mar. 17, 2016

(65) Prior Publication Data

US 2017/0272374 A1    Sep. 21, 2017

(51) Int. Cl.
*H04L 12/875* (2013.01)
*H04L 12/26* (2006.01)

(52) U.S. Cl.
CPC .......... *H04L 47/56* (2013.01); *H04L 43/0888* (2013.01)

(58) Field of Classification Search
CPC ............................ H04L 47/56; H04L 43/0888
See application file for complete search history.

(56) References Cited

U.S. PATENT DOCUMENTS

| | | | |
|---|---|---|---|
| 9,654,527 B1 * | 5/2017 | Narayanan | |
| 2002/0080721 A1 | 6/2002 | Tobagi et al. | |
| 2008/0101226 A1 * | 5/2008 | Albrecht ................ | H04L 47/10 370/230 |
| 2008/0239953 A1 | 10/2008 | Bai et al. | |
| 2009/0319850 A1 * | 12/2009 | Baek ...................... | H04L 1/1874 714/748 |
| 2013/0343194 A1 | 12/2013 | Agarwal | |

FOREIGN PATENT DOCUMENTS

| | | |
|---|---|---|
| EP | 1111857 A2 | 6/2001 |
| JP | 2002354046 A | 12/2002 |
| KR | 20040042668 A | 5/2004 |

OTHER PUBLICATIONS

International Search Report & Written Opinion dated May 24, 2017, for PCT Application No. PCT/US2017/022912, 9 pages.

* cited by examiner

*Primary Examiner* — Hashim Bhatti
(74) *Attorney, Agent, or Firm* — Han Santos, PLLC; Elliott Y. Chen

(57) ABSTRACT

The dynamic proportioning of a maximum queue size of a data transport device queue based on throughput parameters may decrease routing latency of a data transport device. A maximum queue size parameter for a data queue may be calculated based on at least a plurality of throughput parameters during routing of data traffic from a data source device to a data recipient device. Subsequently, a maximum queue size of the data queue may be decreased according to the maximum queue size parameter to prevent enqueuing of incoming service frames into the data queue. The lack of enqueueing of the incoming service frames may cause the data source device to retransmit the one or more incoming service frames to the data transport device, instead of allowing the one or more incoming service frames to be enqueued and trapped in the data queue by additional incoming service frames.

19 Claims, 4 Drawing Sheets

DYNAMICALLY OPTIMIZED QUEUE IN DATA ROUTING

BACKGROUND

Enterprises and other entities may desire access to the Internet and data communications services. Typically, access is obtained via a wired connection to a telecommunication carrier. However, in other instances, access to data services may be obtained via non-wired telecommunication operators, i.e., alternative access vendors (AAVs) that transport data traffic. An example of an AAV is the usage of a wireless telecommunication carrier to create Ethernet Virtual Circuits (EVC), which are an association of two or more service provider networks that implement a point-to-point or multipoint-to-multipoint connection path.

An EVC may route multiple priority levels of data traffic between a network cell and a core network of a wireless telecommunication carrier, in which each priority level of data traffic is required to conform to its corresponding service level agreement (SLA). Specifically, a SLA may specify that a particular priority level of data traffic is to meet certain throughput, availability, latency, and packet loss requirements. In order to meet such requirements, a network router serving the EVC may be mandated to fulfill certain service (QoS) parameters with respect to each priority level of data traffic. These QoS parameters may include committed information rate (CIR), committed burst size (CBS), peak information rate (PIR), and maximum burst size (MBS).

The CIR and the PIR parameters may be used by the SLA to define the guaranteed rate at which service frames of the data traffic are served by a particular queue of the network router. In particular, the CIR is the minimum guaranteed rate at which the service frames are to be served under normal conditions. The PIR is the rate at which the service frame may be served during data bursts when there is excess bandwidth and no data traffic congestion. For example, when the CIR is defined as 50 Megabits per second (Mbps) and the PIR is defined as 100 Mbps, the network router may guarantee that the service frames are served at 50 Mbps, and may allow the service frames to be served at 100 Mbps depending on available resources.

The CBS and MBS parameters may define a queue size of the particular queue in the network router. In particular, a MBS parameter may specify the maximum queue depth for the growth of the queue. The MBS parameter may govern the ability of the queue to serve bursty traffic. Accordingly, the MBS parameter may enable data traffic to burst up to the PIR, and provide for buffering when the PIR is reduced. The ability of a network router to efficiently route data traffic is highly dependent on the dimensioning of the MBS. For example, a MBS that is set too low may cause a failure of the data traffic to burst up to the PIR due to small queue size. Thus, any service frame that are unable to enter the queue may be dropped. These dropped service frames may cause transmission control protocol (TCP) synchronization problems. On the other hand, a MBS that is set too high may cause low priority service frames to become temporarily trapped in the queue of the network router. Such trapped service frames may cause data traffic transmission delays that violate a SLA.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
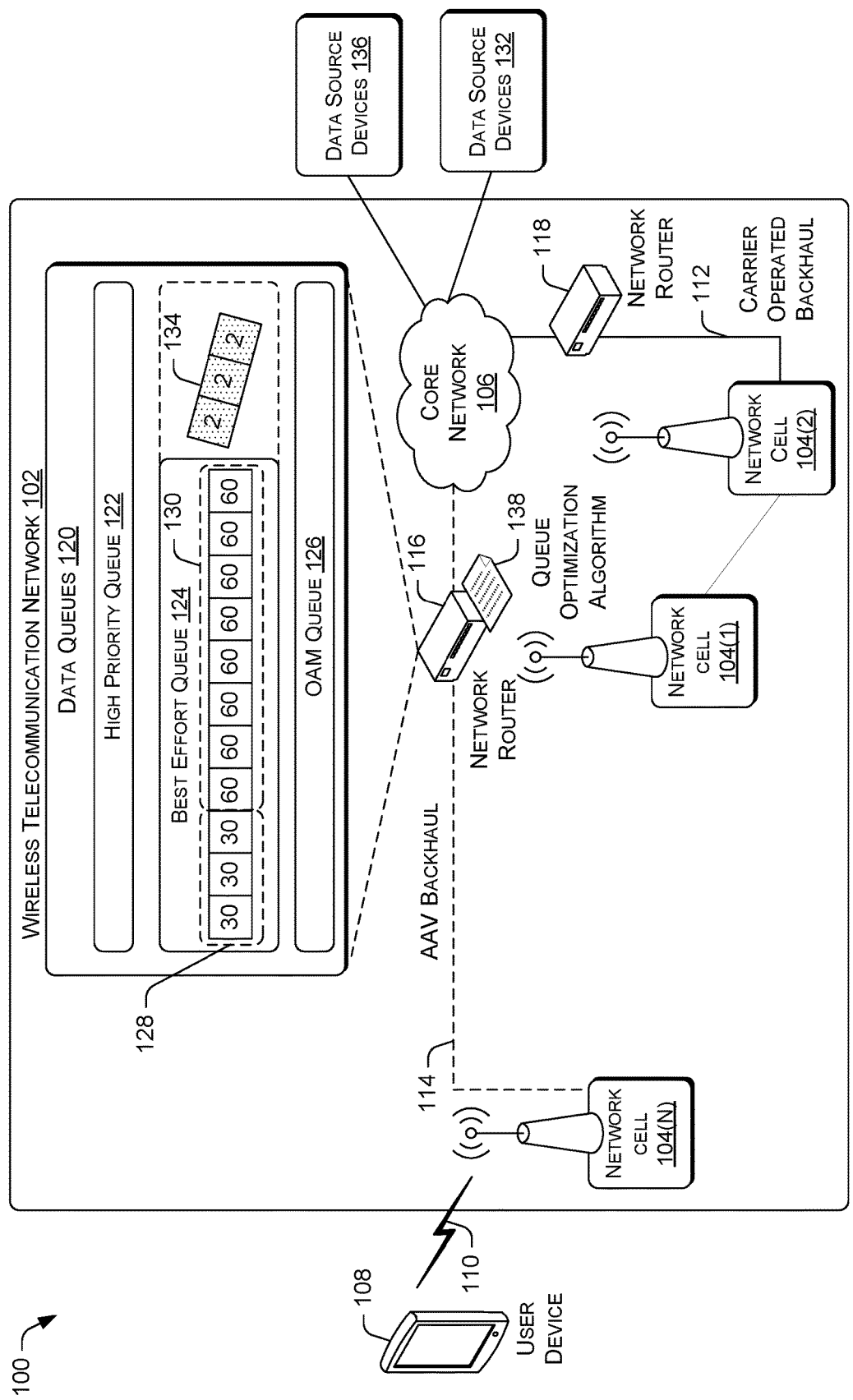
FIG. 1 illustrates an example network architecture for dynamically altering the queue size of a data queue in a data transport device to reduce the routing latency of the data transport device.

This disclosure is directed to techniques for dynamically altering the queue size of a data queue in a data transport device to reduce the routing latency of the data transport device. The data transport device may be a router that routes data traffic between a data source device and a data recipient device. In some instances, the router may be a backhaul router that routes data traffic for a backhaul between a network cell and a core network of a wireless telecommunication network. The backhaul may be a carrier-operated backhaul or an alternative access vendor (AAV) backhaul. The AAV backhaul may be Ethernet Virtual Circuits (EVC), which are an association of two or more service provider networks that implement a point-to-point or multipoint-to-multipoint connection path. However, in other instances, the router may be a network router that is deployed within a core network.

The data transport device may route multiple priority levels of data traffic between a data source device and a data recipient device, in which each priority level of data traffic may be required to conform to its corresponding service level agreement (SLA). Specifically, a SLA may specify that a particular priority level of data traffic meet certain throughput, availability, latency, and packet loss requirements.

However, the data transport device may fail to meet the SLA with respect to certain priority level data traffic in some circumstances. For example, a lower priority service frame may arrive into the data queue of a data transport device. However, once the lower priority service frame is in the queue, the data transport device may become overwhelmed with routing higher priority service frames that arrived later than the lower priority service frame. As a result, the data transport device may buffer the lower priority service frame, essentially trapping the lower priority service frame in the data queue. The lower priority service frame may remain trapped until the data transport device is no longer overwhelmed with the routing of the higher priority service frames.

In order to prevent such a situation, a data transport device may dynamically altering a maximum queue size of a data queue in the data transport device based on throughput parameters so that lower priority incoming service frames are not temporarily trapped in the data queue. In at least some embodiments, the data transport device may receive throughput parameters for routing data from a data source device to a data recipient device. In response, the data transport device may calculate a maximum queue size parameter for a data queue of the data transport device during data traffic routing. The maximum queue size parameter may be calculated based on the throughput parameters. Subsequently, the maximum queue size of the data queue may be modified to match the value of the maximum queue size parameter. In some instances, the modification may cause a decrease in the maximum queue size of the data queue. The decrease in the size of the data queue may prevent the enqueuing of some incoming service frames into the data queue.

The failure of the incoming service frames to be enqueued may cause the incoming service frames to be dropped, thereby causing a data source device to retransmit the incoming service frames to the data transport device. The retransmission of the incoming service frames may actually decrease the routing latency of the service frames by preventing the trapping of the service frames in the data queue. In some instances, routing latency may be reduced from up to five seconds to a generally acceptable 100 milliseconds or less. In the context of a wireless telecommunication network, the reduction in routing latency and the resultant increase in data throughput may improve subscriber experience and subscriber retention. The techniques described herein may be implemented in a number of ways. Example implementations are provided below with reference to the following figures.

Example Network Architecture

FIG. 1 illustrates an example network architecture 100 for dynamically altering the maximum queue size of a data queue in a data transport device to reduce the routing latency of the data transport device. The network architecture 100 may include a wireless telecommunication network 102. The wireless telecommunication network 102 may be operated by a wireless communications carrier. The wireless telecommunication network 102 may include network cells 104(1)-104(N), as well as a core network 106. The network cells 104(1)-104(N) may include radio transceivers that communicate with user devices, such as the user device 108, via a wireless communication link 110. For example, each of the network cells 104(1)-104(N) may be a macrocell a picocell, or another type of wireless telecommunication network cell. In some embodiments, the network cells 104(1)-104(N) may be in the form of eNodeB nodes. Each eNodeB node may include a base transceiver system (BTS) that communicates via an antennae system over an air-link with one or more user devices that are within range. The user device 108 may be a mobile phone, a tablet computer, a portable computer, or any other portable electronic device that is equipped with cellular communication components that enable the portable electronic device to exchange voice and digital data with the mobile telecommunication network.

The core network 106 may provide telecommunication and data communication services. For example, the core network 106 may route voice or data between network cells, as well as to and from other networks operated by additional mobile telecommunication carriers. The core network 106 may also route data traffic to entities on the Internet, and vice versa.

The network cells 104(1)-104(N) may be connected to the core network 106 via backhauls. The backhauls may include carrier-operated backhauls that are owned and/or leased by the mobile telecommunication carrier to exclusively transport backhaul traffic between network cells and the core network 106. For example, the network cells 104(1) and 104(2) may be connected to the core network 106 via a carrier-operated backhaul 112. The backhauls may further include alternative access vendor (AAV) networks that are operated by third-party service providers (ISPs). For example, the network cell 104(N) may be connected to the core network 106 via an AAV backhaul 114. In some instances, the AAV backhaul 114 may include Ethernet Virtual Circuits (EVC), which are an association of two or more service provider networks that implement a point-to-point or multipoint-to-multipoint connection path. The connections of the service provider networks may be cellular connection that are implemented using Multiprotocol Label Switching (MPLS), Synchronous Optical Networking (SONET), or other transport technologies. In various embodiments, each of the backhaul be a wired backhaul, a wireless backhaul, or a combination of both.

The backhauls may be equipped with data transport devices that route data traffic between network cells 104(1)-104(N) and the core network 106. In at least one scenario, the AAV backhaul 114 may be equipped with a network router 116, and the carrier-operated backhaul may be equipped with a network router 118. A network router may support multiple data queues to route data traffic in compliance with different service level agreements (SLAs). For example, the network router 116 may be equipped with multiple data queues 120 that includes a high priority queue 122, a best effort queue 124, and an operation administration management (OAM) queue 126.

The OAM queue 126 may be used to send and receive routing commands that direct the operation of the network router 116. For example, the routing commands may be in the form of command line interface (CLI) commands. The high priority queue 122 may be used to route data traffic that have non-negotiable high priority SLAs. On the other hand, the best effort queue 124 may be used to route traffic that fall under best effort SLAs. Data traffic routing performed using the best effort queue may be dynamically altered using heuristics to reduce overall routing latency, as best effort SLAs generally do not require consistently good performance. Rather, good performance for a majority of a predetermined period of time may be sufficient to satisfy a best effort SLA.

In various embodiments, service frames with different priorities under a best effort SLA may be routed through the best effort queue 124. In such embodiments, the queue strategy may be distributed in a ratio profile, such as 60:30:2 weighted queuing, in which the weights "60", "30" and "2" corresponds to priorities that are used for distributing the service frames. However, the problem is that during some data congestion scenarios, service frames with low weights (e.g., weight of 2) may become trapped in the best effort queue 124. For example, when the network router 116 is routing multimedia streaming data, the best effort queue 124 may be storing a cluster of service frames 128 with a weight of "60", and a cluster of service frames 128 with a weight of "30". The services frames 128 and the service frames 130 may be high and middle priority frames that are provided by data source devices 132 of media streaming service providers. Subsequently, the best effort queue 124 may receive a cluster of service frames 134 with a weight of "2" that are provided by a data source device 136 of an email service provider.

However, once the service frames 134 are in the queue, the best effort queue 124 may receive a continuous streaming of additional service frames with a weight of "60" and a "weight of 30" from the data source devices 132. As a result, the data transport device may buffer the service frames 134, essentially trapping the service frames 134 in the best effort queue 124. The service frames 134 may remain trapped in the best effort queue 124 until the best effort queue 124 ceases to receive the overwhelming number of additional service frames with the weight of "60" and the "weight of 30." Once the overwhelming arrival of the higher priority service frames into the best effort queue 124 has ceased, the network router 116 may route the service frames 134 to a data recipient device, such as the user device 108. However, the delay in the routing the service frames 134 may cause the wireless telecommunication carrier to violate the SLA with the email service provider.

In order to solve this problem, the network router 116 may implement a queue optimization algorithm 138 that dynamically alters a maximum queue size of the best effort queue 124 based on throughput parameters. In some embodiments, these throughput parameters may include an administrative peak information rate (PIR), an operational PIR, a data throughput delay, and an administrative maximum burst size (MBS). Accordingly, given the scenario described above with the service frames 128 and service frames 130 already in the best effort queue 124, the maximum queue size of the best effort queue 124 may be decreased by the queue optimization algorithm 138. The decrease in the size of the best effort queue 124 may prevent the enqueuing of the subsequent arriving service frames 134 into the best effort queue 124. Consequently, the failure of the service frames 134 to be enqueued may cause the data source device 136 to retransmit the service frames 134 to the network router 116. The retransmitted service frames 134 may occur at a time when the maximum queue size of the best effort queue 124 has increased by the queue optimization algorithm 138 because the queue is no longer overwhelmed with higher priority service frames. As a result, the retransmitted service frames 134 may be enqueued in the best effort queue 124 and then routed to the data recipient device. Thus, the retransmission of the service frames 134 by the data source device 136 to the network router 116 may prevent the service frames 134 from becoming trapped in the best effort queue 124, thereby actually decreasing routing latency. While the dynamic altering of maximum queue size to reduce de-queueing latency is illustrated with respect to network router 116, the techniques may be implemented on other routers that serve the wireless telecommunication network 102 or other types of networks. For example, an AAV network which is not a wireless telecommunication backhaul, but which simply connects two network entities, may be equipped with a router that implements the techniques for altering the maximum queue size for reducing routing latency.

Further, the dynamic altering of maximum queue size to reduce routing latency may also be applied to multimedia streaming. In multimedia streaming, a data queue may receive a large number of high priority multimedia service frames that overwhelms the data queue. In such a scenario, one or more of these high priority multimedia service frames may also become trapped in the data queue even when no service frames with higher priority are to be routed. Thus, reducing the maximum queue size of the data queue may cause the one or more high priority multimedia service frame that would have been trapped to be dropped rather than enqueued. Such lack of equeuing may cause a multimedia streaming source to retransmit the one or more high priority multimedia service frames, in which the retransmission may reduce the routing latency of the router.

Example Server Components

Figure 2:
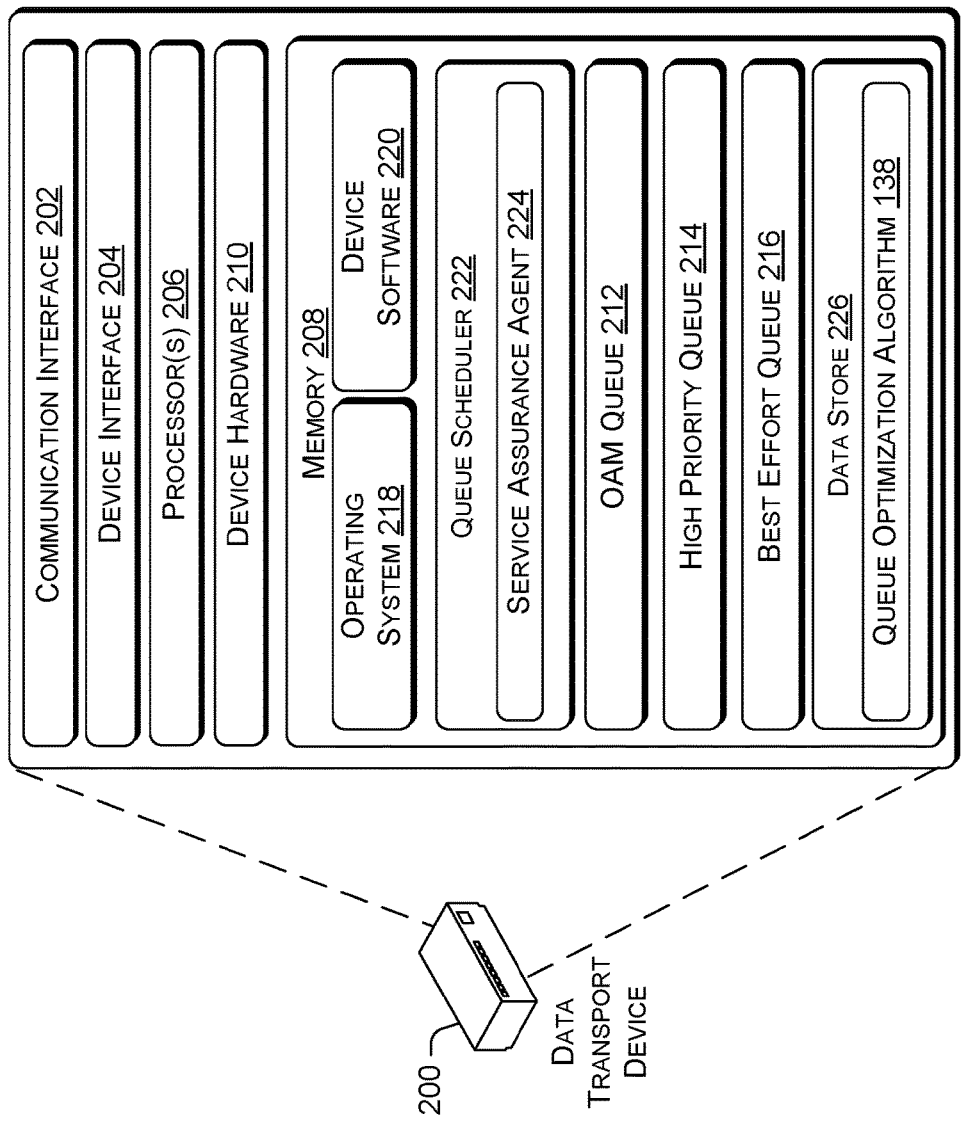
FIG. 2 is a block diagram showing various components of a data transport device that dynamically alters the queue size of its data queue to reduce routing latency.

FIG. 2 is a block diagram showing various components of a data transport device 200 that dynamically alters the maximum queue size of its data queue to reduce routing latency. In various embodiments, the data transport device 200 may be a router or any other type of device that is capable of routing data traffic between a data source device or a data recipient device. The data transport device 200 may be equipped with a communication interface 202, device interface 204, one or more processors 206, memory 208, and other device hardware 210.

The communication interface 202 may include wireless and wired communication components that enable the data transport device 200 to send and receive data. In various embodiments, the wireless communication components may include a transceiver. The wired communication components may include an Ethernet interface, a USB interface, or other I/O interfaces. In some instances, the wired communication components may enable the data transport device 200 to connect to a network cell and the core network.

The device interface 204 may enable a user to provide inputs and receive outputs from the data transport device 200. The device interface 204 may include a data output device (e.g., visual display, audio speakers, tone generators, indicators lights, etc.). Each of the processors 206 may be a single-core processor, a multi-core processor, a complex instruction set computing (CISC) processor, or another type of processor. The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 210 may include other hardware that are typically located in router. For example, the device hardware 210 may include a power source, signal converters, antennas, hardware decoders and encoders, digital signal processors (DSPs), graphic processors, modem, and/or the like that enable the data transport device 200 to execute applications and provide telecommunication and data communication functions. The device hardware 210 may further include an antenna interface controller, a network interface controller, and/or a USB controller. The antenna interface controller may be used by the processors 206 to transmit and receive data through radio waves. In various embodiments, the antenna interface controller may support EDGE, W-CDMA, HSPA, LTE, CDMA-2000 network communication modes.

The memory 208 may store an OAM queue 212, a high priority queue 214, and a best effort queue 216. The OAM queue 212 may send and receive routing commands that direct the operation of the data transport device 200. Additionally, the one or more processors 206 and the memory 208 of the data transport device 200 may implement an operating system 218, device software 220, and a service assurance agent 224. The operating system 218 may include components that enable the data transport device 200 to receive and transmit data via various interfaces (e.g., user controls, communication interface 202, and/or memory input/output devices).

The operating system 218 may also process data using the one or more processors 206 to generate outputs based on inputs that are received via the device interface 204. For example, the operating system 218 may provide an execution environment for the execution of the device software 220. The operating system 218 may include a presentation component that presents the output (e.g., display the data on an electronic display, store the data in memory, transmit the data to another electronic device, etc.). Additionally, the operating system 218 may include other components that perform various other functions generally associated with an operating system. The device software 220 may include software components that enable the data transport device 200 to perform data traffic routing functions, as well as other functions that are typically associated with a router.

The queue scheduler 222 may perform queue scheduling functions. The queue scheduling functions may schedule the high priority queue 214 and the best effort queue 216 to route data traffic between data source devices and data recipient devices. The high priority queue 214 may be used to route data traffic that have non-negotiable high priority SLAs. On the other hand, the best effort queue 216 may be used to route traffic that fall under best effort SLAs. A best effort SLA generally does not require consistently good performance. Rather, good performance for the majority of a predetermined time period may be sufficient to satisfy a best effort SLA. Nevertheless, it may be difficult for the queue scheduler 222 to consistently route data traffic of different priorities such that all such data traffic meet their respective best effort SLAs. This difficulty may be due to unpredictability of the incoming data traffic. For example, the best effort SLA for a multimedia streaming service may demand a higher speed data routing service. On the other hand, the best effort SLA for an email service may demand a lower speed data routing service. However, there is no way for the queue scheduler 222 to predict the priorities of data traffic that are to be routed at any given moment. Indeed, as previously described, the continuous arrival of an overwhelming amount higher priority data traffic may actually lead to lower priority data traffic to become trapped in the best effort queue 216.

Thus, in order to consistently satisfy best effort SLAs for data traffic of different priorities, the queue scheduler 222 may be configured with a service assurance agent 224. The service assurance agent 224 may implement the queue optimization algorithm 138 that is stored in the data store 226. The queue optimization algorithm 138 may dynamically alters a maximum queue size of the best effort queue 216 based on throughput parameters. These throughput parameters may include an administrative PIR, an operational PIR, a data throughput delay, and an administrative MBS.

In various embodiments, the service assurance agent 224 may shrink and grow the maximum queue size of the best effort queue 216 in proportion to the operational PIR of the best effort queue 216. In such embodiments, the service assurance agent 224 may initially derive the operational PIR (oper.PIR) of the queue scheduler 222 based on an administrative PIR (admin.PIR). The administrative PIR and the operational PIR may be measured in bits per second (bps). The administrative PIR may be a predefined value for the best effort queue 216 that is encoded in the hardware of the data transport device 200. Accordingly, the service assurance agent 224 may use an adaptation rule to adapt the administrative PIR into an operational PIR, taking into consideration the underlying hardware capabilities of the data transport device 200. For example, the service assurance agent 224 may derive an operational PIR that is equal to the administrative PIR, higher than but within a predetermined value range of the PIR, lower than but within a predetermined value of range of the PIR, or closest in value to the administrative PIR. However, in other embodiments, the data transport device 200 may receive the administrative PIR and/or the operational PIR at the OAM queue 212 from an external source, such as a remote server or computing device.

Subsequently, the service assurance agent 224 may calculate an operational MBS (oper.MBS$_{bytes}$ for the best effort queue 216 based on the operational PIR. The service assurance agent 224 may calculate the operational MBS using a formula as follows:

$$admin.MBS_{bytes} = \text{Delay}_s \left( \frac{admin.PIR_{bps}}{8} \right) \quad (1)$$

$$oper.MBS_{bytes} = admin.MBS_{bytes} * \left( \frac{oper.PIR_{bps}}{admin.PIR_{bps}} \right) \quad (2)$$

in which Delay$_s$ is a running average of the routing latency (in seconds) of the data transport device 200 in a predetermined amount of time immediately prior to the calculation of the operational MBS. In other words, the running average is an average of the routing latency in the last N frames immediately prior to the calculation. The value "8" in equation (1) is a conversion factor for converting bits to bytes, as there are eight bits in a byte. The equations (1) and (2) of the formula may balance an administrative throughput parameter with an operational parameter to minimize routing latency. For example, the administrative PIR may be balanced with the operational PIR, and the administrative MBS may be balanced with the operational MBS.

Following the calculation of the operational MBS, the service assurance agent 224 may increase or decrease the maximum queue size of the best effort queue 216 to match the value of the operational MBS. Thus, if the maximum queue size of the best effort queue 216 exceeds the calculated operational MBS, the service assurance agent 224 may decrease the maximum queue size of the best effort queue 216 to equal to the value of the operational MBS. Such a decrease may prevent the enqueuing and trapping of the subsequent arriving lower priority service frames in the best effort queue 216 by additional higher priority service frames that arrive. Further, the failure of such lower priority service frames to be enqueued may cause a data source device to retransmit the service frames to the network router 116. In many cases, such failure and retransmit may actually decrease the routing latency of the data transport device 200.

However, if the maximum queue size of the best effort queue 216 is less than the calculated operational MBS, the service assurance agent 224 may increase the maximum queue size to match the value of the operational MBS. The increase in the maximum queue size of the best effort queue may enable the best effort queue 216 to accommodate additional service frames. Further, if the maximum queue size of the best effort queue 216 is equal to the calculated operational MBS, the service assurance agent 224 may leave the maximum queue size unchanged. Following a preset time interval, the service assurance agent 224 may once again re-calculate the operational MBS for the best effort queue 216. Such recalculation may be repeated over successive time intervals, so that the maximum queue size of the best effort queue 216 may be dynamically and repeatedly adjusted to minimize routing traffic latency.

In other embodiments, rather than as an integral part of the queue scheduler 222, the service assurance agent 224 may be located remote to the queue scheduler 222. For example, the service assurance agent 224 may be located on a remote computing device or cloud location that connects to the data transport device 200 via a network. Furthermore, while the dynamic maximum queue size proportioning is described as being performed with respect to the best effort queue 216, the service assurance agent 224 may perform such proportioning for multiple queues of a data transport device or multiple data transport devices on a successive or concurrent basis.

Example Processes

Figure 3:
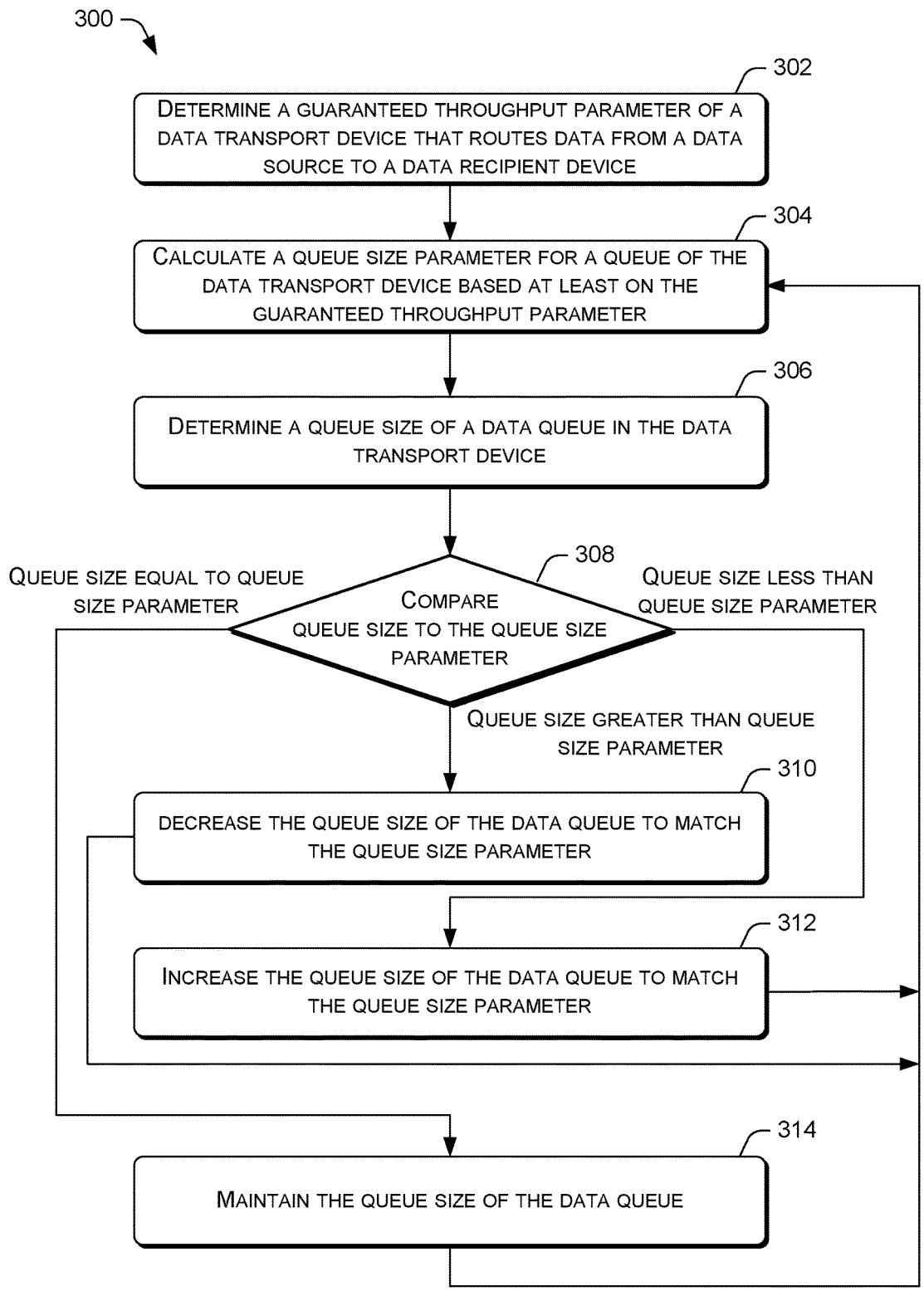
FIG. 3 is a flow diagram of an example process for dynamically altering the queue size of a data queue in a data transport device to reduce routing latency.
Figure 4:
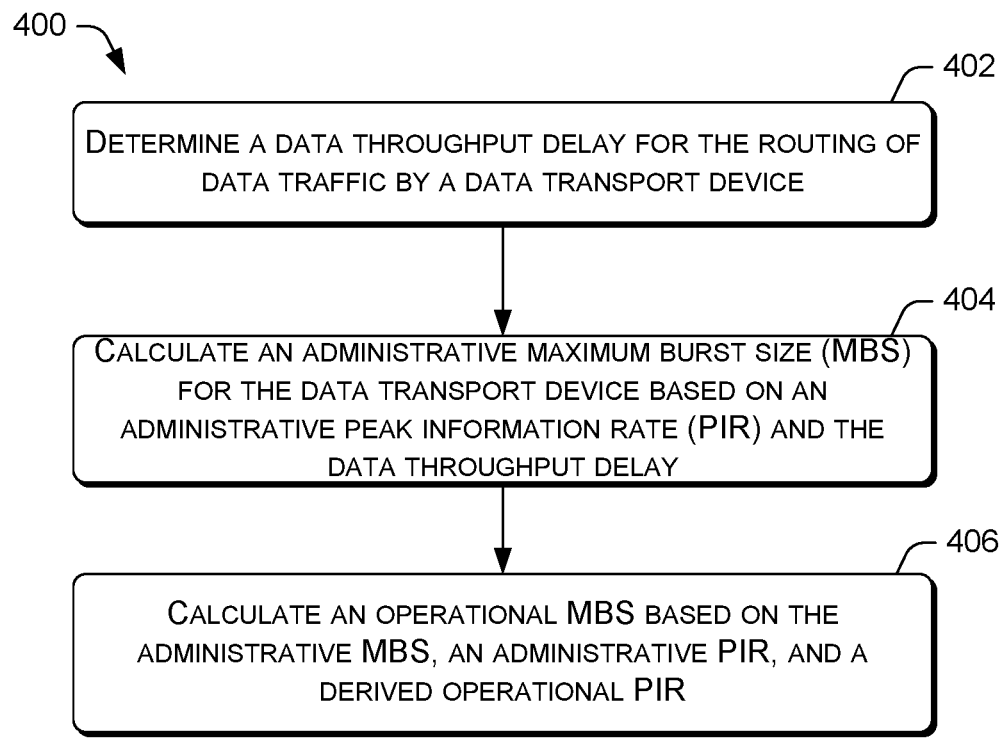
FIG. 4 is a flow diagram of an example process for calculating an operational maximum burst size (MBS) for dynamically altering the queue size of a data queue.

FIGS. 3 and 4 present illustrative processes 300 and 400 for dynamically altering the maximum queue size of a data queue in a data transport device to reduce the routing latency of the data transport device. Each of the processes 300 and 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300 and 400 are described with reference to the network architecture 100 of FIG. 1.

FIG. 3 is a flow diagram of an example process 300 for dynamically altering the maximum queue size of a data queue in a data transport device to reduce routing latency. At block 302, a service assurance agent 224 may determine one or more throughput parameters of a data transport device 200 that routes data from a data source device to a data recipient device. The service assurance agent 224 may be a part of the queue scheduler in the data transport device. The guaranteed throughput parameter may be a predefined value that is encode into the hardware for a data queue of a data transport device 200.

At block 304, the service assurance agent 224 may calculate a maximum queue size parameter for the queue of the data transport device 200 based on at least the one or more throughput parameters. In various embodiments, the maximum queue size parameter may be calculated based on a guaranteed throughput parameter and a data throughput latency. The data throughput latency may be a running average of the routing latency of the data transport device for a predetermine time period immediately preceding the calculation. In at least one embodiment, the maximum queue size parameter may be the operational MBS. The queue may be a best effort queue that is for routing data traffic with different priority levels, in which the data traffic for each priority level is supposed to meet a corresponding best effort SLA. In some instances, the guaranteed throughput parameter may be the administrative PIR.

At block 306, the service assurance agent 224 may determine a maximum queue size of the data queue in the data transport device 200. The maximum queue size, which may also be referred to as maximum queue length, is measured in bytes. The maximum queue size of the data queue may control the number of the service frames that can be stored in the queue.

At decision block 308, the service assurance agent 224 may compare the maximum queue size of the queue to the maximum queue size parameter. Accordingly, if the service assurance agent 224 determines that the maximum queue size is greater than the maximum queue size parameter, the process 300 may proceed to block 310.

At block 310, the service assurance agent 224 may decrease the maximum queue size of the data queue to match a value of the maximum queue size parameter, in which both the maximum queue size and the maximum queue size parameter are expressed in bytes. Such a decrease may prevent the enqueuing and trapping of the subsequent arriving lower priority service frames in the data queue by additional higher priority service frames that arrive. Further, the failure of such lower priority service frames to be enqueued may cause a data source device to retransmit the service frames to the network router 116. Subsequently, the process 300 may loop back to block 304. The looping of the process 300 back to block 304 may enable the service assurance agent 224 to once again re-calculate the maximum queue size parameter for the data queue. Such recalculation may be repeated over successive time intervals, so that the maximum queue size of the data queue may be dynamically and repeatedly adjusted to minimize routing traffic latency.

However, if the service assurance agent 224 determines that the maximum queue size is less than the maximum queue size parameter, the process 300 may proceed to block 312. At block 312, the service assurance agent 224 may increase the maximum queue size to match the value of the maximum queue size parameter. Such an increase may enable the best effort queue 216 to accommodate additional service frames. Subsequently, the process 300 may loop back to block 304. Alternatively, if the service assurance agent 224 determines that the maximum queue size is equal to the maximum queue size parameter, the process 300 may proceed to block 314. At block 314, the service assurance agent 224 may maintain the maximum queue size of the data queue. Subsequently, the process 300 may loop back to block 304.

FIG. 4 is a flow diagram of an example process 400 for calculating an operational MBS for dynamically altering the maximum queue size of a data queue. The process 400 may further describe block 304 of the process 300. At block 402, the service assurance agent 224 may determine a data throughput delay for the routing of data traffic by a data transport device 200. In various embodiments, the data throughput delay is a running average of the routing latency (in seconds) of the data transport device 200 in routing data traffic in a predetermined amount of time immediately prior to the calculation of the operational MBS.

At block 404, the service assurance agent 224 may calculate an administrative MBS for the data transport device based on an administrative PIR and the data throughput delay. At block 406, the service assurance agent 224 may compute an operational MBS based on the administrative MBS, the administrative PIR, and an operational PIR that is derived from the administrative PIR. In some embodiments, the service assurance agent 224 may use an adaptation rule to derive the operational PIR from the administrative PIR, taking into consideration the underlying hardware capabilities of the data transport device 200. In other embodiments, the data transport device 200 may receive the administrative PIR and the operational PIR from an external source.

The dynamic proportioning of the maximum queue size of a data transport device queue based on throughput parameters may decrease routing latency of a data transport device. In some instances, routing latency may be reduced from up to five seconds to a generally acceptable 100 milliseconds or less. In the context of a wireless telecommunication network, the reduction in routing latency and the resultant increase in data throughput may improve subscriber experience and subscriber retention.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A data transport device, comprising:
one or more processors; and
memory including one or more data queues and a plurality of computer-executable components that are executable by the one or more processors to perform a plurality of actions, the plurality of actions comprising:
calculating a maximum queue size parameter for a data queue based on at least a plurality of throughput parameters during routing of data traffic from a data source device to a data recipient device, the plurality of throughput parameters including an administrative peak information rate (PIR), and a data throughput delay of the data transport device that is a running average of routing latency of the data transport device in routing data traffic in a predetermined amount of time prior to the calculating of the maximum queue size parameter; and
decreasing a maximum queue size of the data queue according to the maximum queue size parameter to prevent enqueuing of one or more incoming service frames into the data queue, such lack of enqueueing causes the data source device to retransmit the one or more incoming service frames to the data transport device instead of allowing the one or more incoming service frames to be enqueued and trapped in the data queue by one or more other incoming service frames.

2. The data transport device of claim 1, wherein the lack of enqueuing and retransmitting of the one or more incoming service frames reduces routing latency of the one or more incoming service frames from the data source device to the data recipient device.

3. The data transport device of claim 1, wherein data queue is a best effort queue for routing service frames of multiple priorities in accordance with different service level agreements.

4. The data transport device of claim 1, wherein the plurality of actions further comprise receiving at least one of the throughput parameters at a low priority data queue of the data transport device from an external source.

5. The data transport device of claim 1, wherein the plurality of throughput parameters further include an operational PIR and an administrative maximum burst size (MBS).

6. The data transport device of claim 5, wherein the calculating including calculating the maximum queue size parameter according to a formula as follows:

$$admin.MBS_{bytes} = Delay_s \left( \frac{admin.PIR_{bps}}{8} \right), \text{ and}$$

$$oper.MBS_{bytes} = admin.MBS_{bytes} * \left( \frac{oper.PIR_{bps}}{admin.PIR_{bps}} \right),$$

wherein the admin.$PIR_{bps}$ is the administrative PIR, the $Delay_s$ is the data throughput delay, the admin.$MBS_{bytes}$ is the administrative MBS, the oper.$PIR_{bps}$ is the operational PIR, and the oper.$MBS_{bytes}$ is the maximum queue size parameter.

7. The data transport device of claim 6, wherein the formula balances an administrative throughput parameter with an operational throughput parameter.

8. The data transport device of claim 6, wherein the formula reduces data traffic latency for streaming of multimedia service frames or low priority service frames by the data transport device.

9. The data transport device of claim 1, wherein the actions further comprise calculating an additional maximum queue size parameter for an additional data queue based on a different set of throughput parameters during routing of data traffic from the data source device to the data recipient device, the additional maximum queue size parameter being different in value than the maximum queue size parameter.

10. The data transport device of claim 1, wherein the data transport device further includes an additional high priority queue for routing data traffic according to a high priority service level agreement.

11. One or more non-transitory computer-readable media storing computer-executable instructions that upon execution cause one or more processors to perform acts comprising:
determining a plurality of throughput parameters for a data transport device during routing of service frames between a data source device and a data recipient device, the plurality of throughput parameters including a guaranteed throughput parameter that is an administrative peak information rate (PIR), and a data throughput delay of the data transport device that is a running average of routing latency of the data transport device in routing data traffic in a predetermined amount of time;
calculating a maximum queue size parameter for a data queue based on at least the plurality of throughput parameters; and
decreasing a maximum queue size of the data queue according to the maximum queue size parameter to prevent enqueuing of one or more incoming service frames into the data queue, such lack of enqueueing causes the data source device to retransmit the one or more incoming service frames to the data transport device instead of allowing the one or more incoming service frames to be enqueued and trapped in the data queue by one or more other incoming service frames.

12. The one or more non-transitory computer-readable media of claim 11, wherein the lack of enqueuing and retransmitting of the one or more incoming service frames reduces routing latency of the one or more incoming service frames from the data source device to the data recipient device.

13. The one or more non-transitory computer-readable media of claim 11, wherein the maximum queue size parameter is an operational maximum burst size (MBS), and wherein the calculating includes:

calculating an administrative MBS for the data transport device based on the administrative PIR and the data throughput delay; and computing the operational MBS based on the administrative MBS, the administrative PIR, and an operational PIR that is derived from the administrative PIR.

14. The one or more non-transitory computer-readable media of claim 11, where the calculating balances an administrative throughput parameter with an operational throughput parameter.

15. The one or more non-transitory computer-readable media of claim 11, wherein the acts further comprise:

recalculating the maximum queue size parameter for the data queue based on the plurality of throughput parameters; and increasing the maximum queue size of the data queue according to the maximum queue size parameter as recalculated to enable the data queue to accommodate additional service frames that are to be routed by the data transport device.

16. The one or more non-transitory computer-readable media of claim 11, wherein data queue is a best effort queue for routing service frames of multiple priorities in accordance with different service level agreements.

17. A computer-implemented method, comprising:

determining, at a data transport device, a plurality of throughput parameters for a data transport device during routing of service frames between a data source device and a data recipient device, the plurality of throughput parameters including an administrative peak information rate (PIR) and a data throughput delay of the data transport device;

calculating an administrative maximum burst size (MBS) for the data transport device based on the administrative PIR and the data throughput delay;

computing an operational MBS based on the administrative MBS, an administrative PIR, and an operational PIR that is derived from the administrative PIR; and decreasing a maximum queue size of a data queue according to the operational MBS to prevent enqueuing of one or more incoming service frames into the data queue, such lack of enqueueing causes the data source device to retransmit the one or more incoming service frames to the data transport device instead of allowing the one or more incoming service frames to be enqueued and trapped in the data queue by one or more additional higher priority incoming service frames.

18. The computer-implemented method of claim 17, wherein the lack of enqueuing and retransmitting of the one or more incoming service frames reduces routing latency of the one or more incoming service frames from the data source device to the data recipient device.

19. The computer-implemented method of claim 17, further comprising:

recalculating the operational MBS for the data queue based on the plurality of throughput parameters; and increasing the maximum queue size of the data queue according to the operational MBS as recalculated to enable the data queue to accommodate additional service frames that are to be routed by the data transport device.

* * * * *